United States Patent [19]

Kennedy et al.

[11] Patent Number: 5,125,105
[45] Date of Patent: Jun. 23, 1992

[54] HIGH-QUALITY RECEPTION INDICATING CIRCUIT FOR FM RECEIVERS

[75] Inventors: John F. Kennedy, Garden City; Yao H. Kuo, Canton, both of Mich.

[73] Assignee: Ford Motor Company, Dearborn, Mich.

[21] Appl. No.: 443,624

[22] Filed: Nov. 30, 1989

[51] Int. Cl.⁵ .............................................. H04B 1/10
[52] U.S. Cl. ................... 455/164.1; 455/226.2; 455/297; 381/13
[58] Field of Search ............... 455/297, 161, 164, 173, 455/222, 226, 307; 381/13

[56] References Cited

U.S. PATENT DOCUMENTS

| | | | |
|---|---|---|---|
| 3,947,774 | 3/1976 | Glennon et al. | 325/470 |
| 3,984,776 | 10/1976 | Stedman | 325/305 |
| 4,198,543 | 4/1980 | Schertz et al. | 179/1 GM |
| 4,253,195 | 2/1981 | Garskamp | 455/166 |
| 4,262,363 | 4/1981 | Wiechmann et al. | 455/161 |
| 4,376,207 | 5/1983 | Kubota | 179/16 C |
| 4,509,203 | 4/1985 | Yamada | 455/166 |
| 4,525,864 | 6/1985 | Kawakami | 455/161 |
| 4,538,300 | 8/1985 | Richards, Jr. | 455/161 |
| 4,577,226 | 3/1986 | Avins | 358/143 |
| 4,580,285 | 4/1986 | Richards, Jr. | 455/161 |
| 4,688,264 | 8/1987 | Miura | 455/168 |
| 4,761,829 | 8/1988 | Lynk, Jr. et al. | 455/307 |
| 4,947,456 | 8/1990 | Atkinson et al. | 455/165 |
| 4,975,953 | 12/1990 | Kennedy et al. | 381/13 |

Primary Examiner—Reinhard J. Eisenzopf
Assistant Examiner—Edward Urban
Attorney, Agent, or Firm—Mark Mollon; Roger L. May

[57] ABSTRACT

The reception of FM broadcast signals having a selected high sound quality is determined according to criteria including a low noise level and the absence of interference. The high quality information is employed to terminate a scan tuning operation or to activate an ultrasonic noise filter to improve listening quality of the FM audio output. The absence of noise and interference is determined by examining a particular frequency range from the FM field intensity line generated by an intermediate frequency circuit.

10 Claims, 3 Drawing Sheets

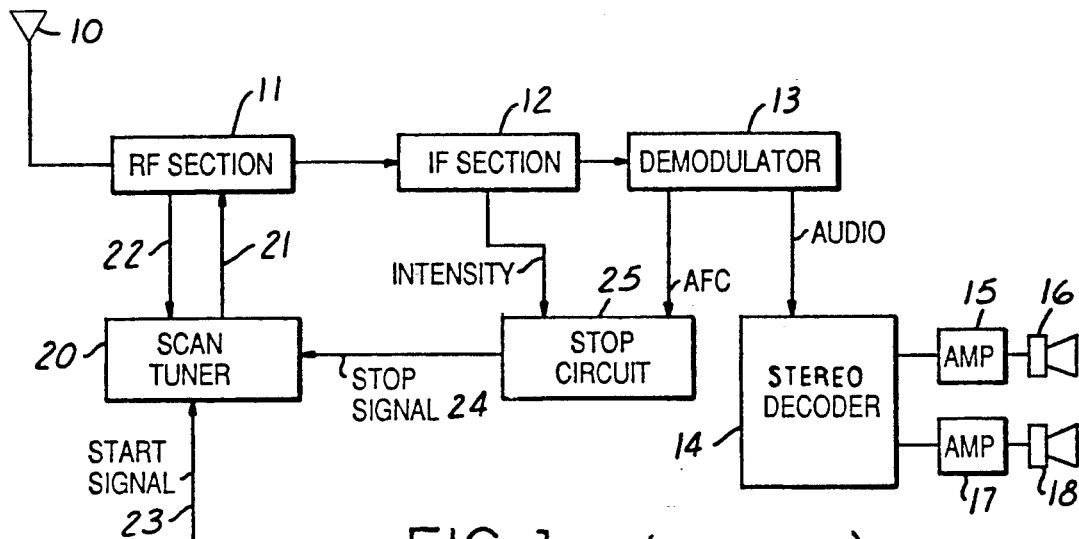
FIG. 1 (PRIOR ART)
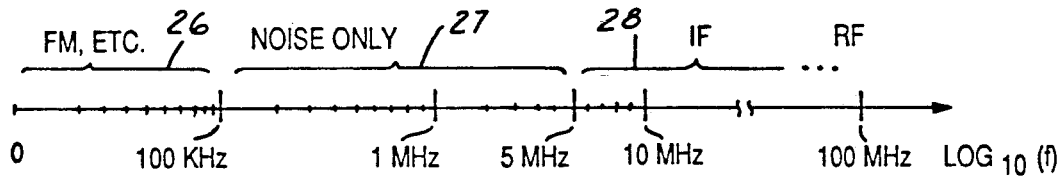
FIG. 2
FIG. 3
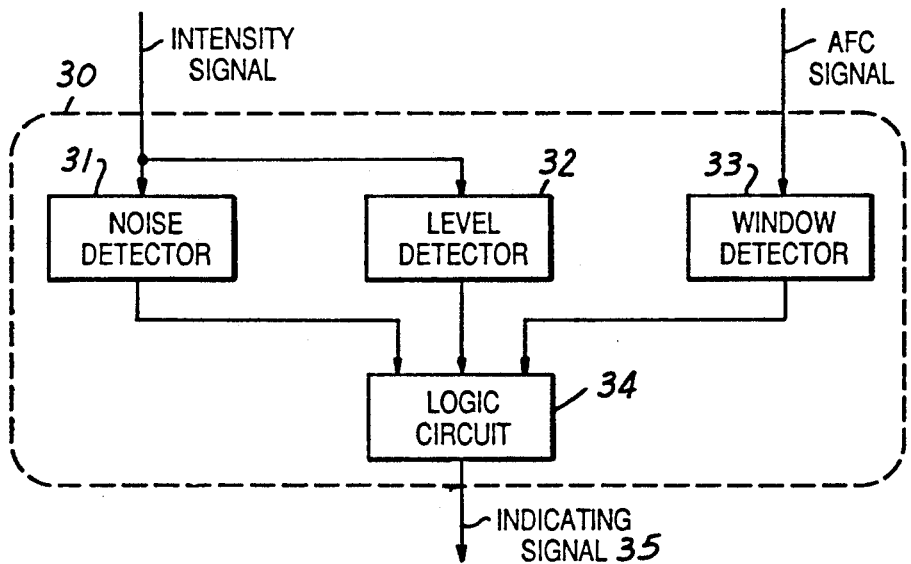

HIGH-QUALITY RECEPTION INDICATING CIRCUIT FOR FM RECEIVERS

BACKGROUND

The present invention relates in general to identifying signal quality of a received radio transmission, and more specifically to an indicating circuit for detecting the presence of a strong FM signal without the presence of noise or interference. The present application is related to U.S. Pat. No. 5,073,976 filed concurrently herewith.

The measurement of received signal quality has been employed in FM receivers for implementing a number of different functions. For example, automatic scan tuners which sweep through the FM broadcast band must terminate a scan when a broadcast signal is received having a particular signal quality. Signal quality is also measured in order to modify receiver characteristics in response to certain conditions, e.g., output blanking or reducing stereo separation in response to the presence of noise.

Several different methods have been employed to generate a stop signal for terminating the sweep operation in an automatically scanning tuner. Most methods rely on a measure of the received signal strength, or a frequency window determined by the automatic frequency control (AFC) signal, or a combination of both. Integrated circuits are commercially available which provide FM intermediate frequency (IF) demodulating systems These systems include signal strength level detectors and AFC window detectors that are or can be interconnected to generate stop pulses for scan tuning operations (e.g., the CA3209E integrated circuit made by RCA Solid State Division and the TDA 4220 integrated circuit made by Siemens).

The presence of a received signal strength greater than a predetermined magnitude provides an insufficient indicator of signal quality to stop a scan tuning operation because the received signal strength may be high while signal quality is low due to the presence of noise, adjacent channel interference, or multipath interference. Even with the use of a frequency window to ensure that scanning is stopped accurately at the frequency of a strong received signal, stopping on a received signal which includes noise and interference continues to be a problem.

It is also known to examine the noise component of a signal relative to the information signal component in order to determine signal quality. For example, communications transceivers employ output inhibiting or squelch when a particular level of noise is present. However, the prior art systems measure noise at frequencies that also contain information-related components. Therefore, only noise that is substantially equal to or greater than the information component can be detected.

SUMMARY OF THE INVENTION

It is a principal object of the present invention to detect the reception of an FM signal having a predetermined signal quality in a manner which is highly sensitive to noise levels.

It is a further object of the invention to provide apparatus and method for detecting the presence of a high quality received FM broadcast signal which is accurately tuned in and which is substantially unaffected by noise.

It is another object of the invention to provide for scan tuning of an FM radio wherein a scan operation is stopped only when a signal is received having a predetermined signal quality.

It is still another object to improve the listening quality of a received signal whenever the detected quality falls below a predetermined value.

These and other objects are achieved by a quality detecting circuit for an FM receiver. The receiver includes an IF detector generating an intensity signal indicating the received field strength of the FM signal being received The receiver also includes an FM demodulator which generates an automatic frequency control signal indicating the amount of error between the value of the carrier frequency of the FM signal as received and its correct value. The quality detecting circuit comprises a level detector means adapted to be coupled to the IF detector for producing a first signal when the intensity signal is greater than a predetermined intensity. Window detector means is adapted to be coupled to the FM demodulator for producing a second signal when the automatic frequency control signal is within a predetermined window. Noise filter means is adapted to be coupled to the IF detector for generating a filtered noise signal derived from the intensity signal. The filter means rejects frequencies containing components related to the intelligence contained in the FM signal. Peak detector means is coupled to the noise filter means for producing a third signal when the filtered noise signal is below a predetermined peak value. Logic means is coupled to the level detector means, the window detector means, and the peak detector means for producing an indicating signal in response to the simultaneous occurrence of the first, second, and third signals to indicate that a high quality FM signal is being received.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with accompanying drawings, in which:

FIG. 1 is a block diagram of a scan tuning FM receiver according to the prior art.

FIG. 2 is a logarithmic plot showing frequency ranges for various signal components present within an FM receiver.

FIG. 3 is a block diagram showing a signal quality detecting circuit according to the present invention.

DETAILED DESCRIPTION OF PREFERRED EMBODIMENTS

Figure 4:
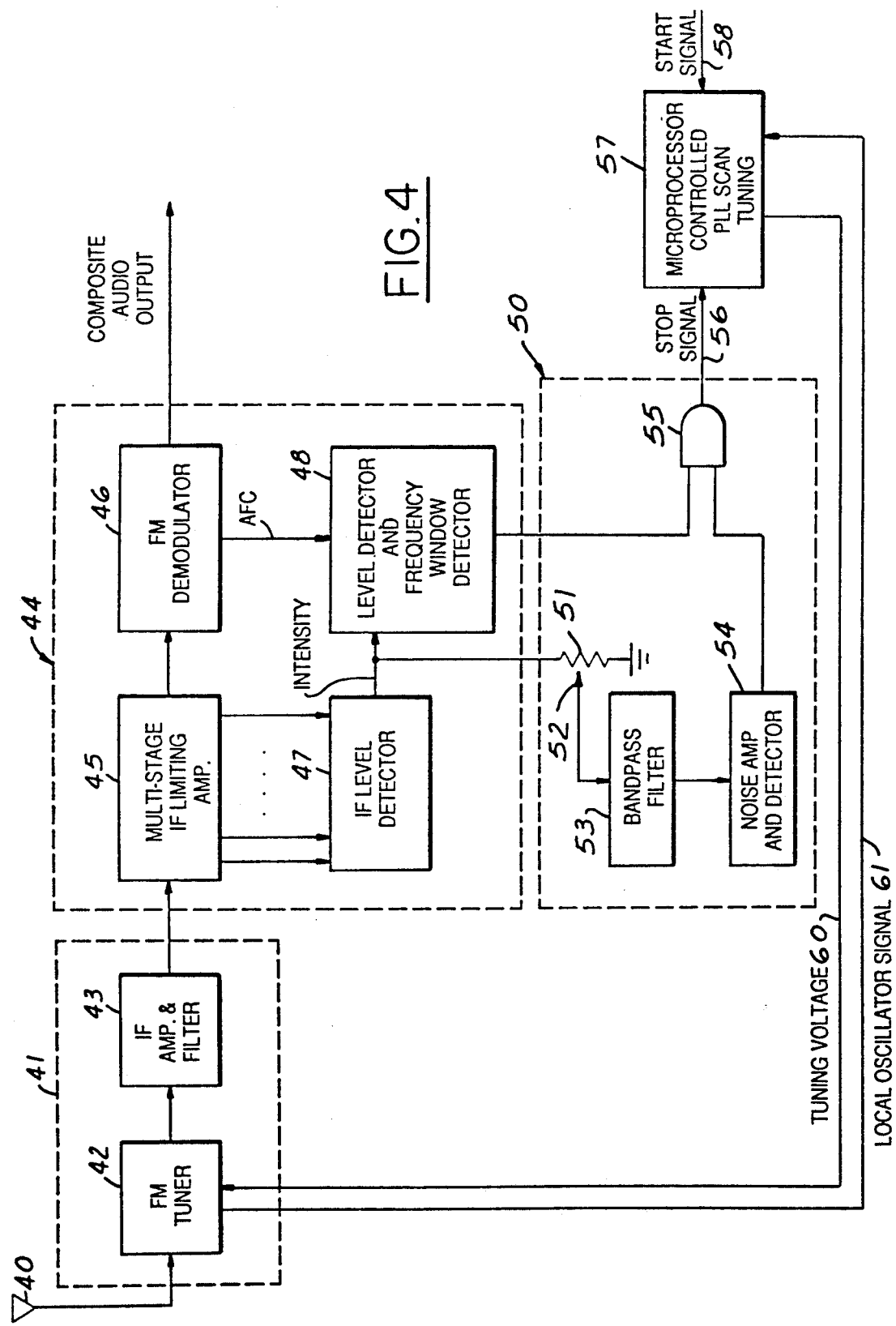
FIG. 4 is a block diagram showing a scan tunning FM receiver employing a stop circuit according to the present invention.

FIG. 1 shows a well known FM receiver architecture including an antenna 10, an RF section 11, an IF section 12, a demodulator 13, a stereo decoder 14, left and right audio amplifiers 15 and 17, and stereo speakers 16 and 18. Electronic tuning of the FM receiver is accomplished by means of a scan tuner 20 which provides a tuning voltage over a line 21 to RF section 11. A local oscillator contained in RF section 11 provides a local oscillator signal used for deriving an intermediate frequency. The local oscillator signal is also provided from RF section 11 to scan tuner 20 over a line 22 for implementing electronic control over the RF tuning using a phase locked loop, for example.

Scan tuning of the FM receiver is implemented by sweeping the tuning voltage provided over line 21 in response to a start signal 23 provided to scan tuner 20. Sweeping of the tuning voltage continues automatically until an FM signal is received meeting the criteria for identifying a signal of a predetermined quality. When such a signal is received, a stop signal 24 is provided to scan tuner 20 from a stop circuit 25. An intensity signal is provided from IF section 12 to stop circuit 25 and an automatic frequency control (AFC) signal is provided from demodulator 13 to stop circuit 25. As taught in the prior art, stop circuit 25 generates a stop signal in response to the intensity signal being above a predetermined intensity and the AFC signal being within a frequency window to indicate that the station is accurately tuned in.

The conventional stop circuit shown in FIG. 1 has the disadvantage that it may stop on a sideband of a strong signal, or on a signal contaminated by noise or interference.

In order to reduce the false stopping or identification of such noisy signal as a good quality signal, the present invention analyzes an additional characteristic of the signal to produce a high quality FM signal detector.

FIG. 2 shows a signal spectrum within an FM receiver plotted on a logarithmic scale. An FM receiver output is affected by broadband noise which is present across the entire spectrum. A range of frequencies 26 is identified which includes FM broadcast signals and harmonics. The FM signals include the stereo sum baseband channel from zero to 15 KHz, a pilot signal at 19 KHz, stereo difference channel sidebands extending from 23 KHz to 53 KHz, and a subsidiary communication authorization (SCA) signal from 60 to 74 KHz. In Europe, the FM signal also includes a subcarrier at 57 KHz for modulating traffic and other information according to the Radio Data System (RDS) employed there. Harmonics from these various FM signals appear in the FM receiver extending up to the upper end of range 26 at about 100 KHz to about 150 KHz. The harmonics or other nonlinear products from signal mixing are caused by IF filters and limiting amplifiers, for example.

A range of frequencies 28 extends from 5 MHz and higher and includes intermediate frequency signals and radio frequency signals orginating in tuned-in or nearly tuned-in FM broadcasts. The intermediate frequency of an accurately tuned in signal is located at about 10.7 MHz, but IF signals from adjacent channels can appear somewhat below 10.7 MHz.

The signals present in the FM receiver in frequency ranges 26 and 28 contain the information content of the desired FM signal being received. However, a range of frequencies 27 extending from about 100 KHz to about 5 MHz contains noise only. Frequency range 27 lacks any signal components related to the intelligence contained in the FM signal being received and is used herein to derive a measure of signal noise which is not masked by the information signal content.

FIG. 3 shows a quality detecting circuit 30 including a noise detector 31 receiving the field intensity signal produced by a conventional IF detector (not shown). The field intensity signal is sometimes referred to as the stereo blend signal. The intensity signal is further provided to a level detector 32. The AFC signal provided by a conventional demodulator (not shown) is input to a window detector 33. The outputs of noise detector 31, level detector 32, and window detector 33 are respectively input to a logic circuit 34. The output of logic circuit 34 provides an indicating signal 35 which can be employed as a stop signal, for example.

In operation, noise detector 31 isolates that frequency range of the intensity signal which contains no components related to the FM signal intelligence. The isolated noise signal is compared to a predetermined value and a signal is provided to logic circuit 34 when the isolated noise signal is below the predetermined value. Level detector 32 compares the intensity signal to a predetermined intensity and produces an output signal transmitted to logic circuit 34 when the intensity signal is greater than the predetermined intensity. Window detector 33 compares the AFC signal to a pair of window threshold values and generates an output signal which is coupled to logic circuit 34 when the AFC signal is within the predetermined window to indicate that the FM station is accurately tuned in. Logic circuit 34 preferably performs an AND function for generating indicating signal 35 when signals from noise detector 31, level detector 32, and window detector 33 are simultaneously received.

FIG. 4 shows an FM scan tuning receiver having a stop circuit according to the present invention and using typical integrated circuits for major portions of the receiver. An antenna 40 is coupled to a receiver front end IC 41. IC 41 includes an FM tuner 42 and an IF amplifier and filter section 43. The output of IF amplifier and filter section 43 is connected to an multistage IF limiting amplifier 45 in an IF demodulating system IC 44. The amplitude limited IF signal from multistage amplifier 45 is coupled to an FM demodulator 46 which provides a composite audio output having stereo sum and difference channels. Each amplifying stage in multistage amplifier 45 is connected to an IF level detector 47 that generates an intensity signal which is proportional to the field intensity at which the FM signal is being received. The intensity signal is provided to a level detector and frequency window detector 48 which also receives an AFC signal from FM demodulator 46. Detector 48 provides an output signal to one input of an AND gate 55 in a high quality detector circuit 50. Quality detector circuit 50 implements the functions of quality detecting circuit 30 (FIG. 3) that are not already implemented in IC 44 in FIG. 4. In other words, level detector and frequency window detector 48 performs the functions of level detector 32, window detector 33, and part of logic circuit 34 in FIG. 3.

The intensity signal from IF level detector 47 is provided across a threshold setting potentiometer 51. A threshold tap 52 couples an attenuated intensity signal to a bandpass filter 53. The filtered intensity signal is provided from bandpass filter 53 to a noise amplifier and peak detector 54. Potentiometer 51, filter 53, and noise amplifier and detector 54 correspond to noise detector 31 in FIG. 3. The output of detector 54 is connected to the remaining input of AND gate 55.

The output of AND gate 55 provides a stop signal (i.e., indicating signal) 56 which is coupled to a microprocessor-controlled phase locked loop scan tuning circuit 57. Circuit 57 receives a start signal 58 in response to operator actuation of a scan tuning operation.

A phase lock loop tuning voltage 60 is provided from circuit 57 to FM tuner 42 which contains a local oscillator. The local oscillator signal 61 is provided from FM tuner 42 to scan tuning circuit 57.

In operation, bandpass filter 53 provides a noise signal not related to FM signal intelligence by virtue of the pass band of bandpass filter 53 being in the range from 100 KHz to about 5 MHz. Preferably, bandpass filter 53 has a lower cutoff frequency equal to about 200 KHz and an upper cutoff frequency equal to about 2 MHz or has a smaller passband within that range. Detector 54 detects the peak value of the filtered noise and compares the detected peak value with a predetermined peak value. Detector 54 generates a high logic signal output when the noise signal is below a predetermined peak value. If the intensity signal is greater than the predetermined intensity and if the frequency error signal (i.e., AFC signal) is within the frequency window, then detector 48 also generates a high logic level output and AND gate 55 generates a high level output. The resulting stop signal 56 stops a scan tuning operation only on received signals of the highest quality. By virtue of the pass band of bandpass filter 53, scanning will not stop on any FM signal including an unacceptable level of any noise including thermal noise, adjacent channel interference noise, multipass distortion noise, overmodulation noise, or digital noise.

Figure 5:
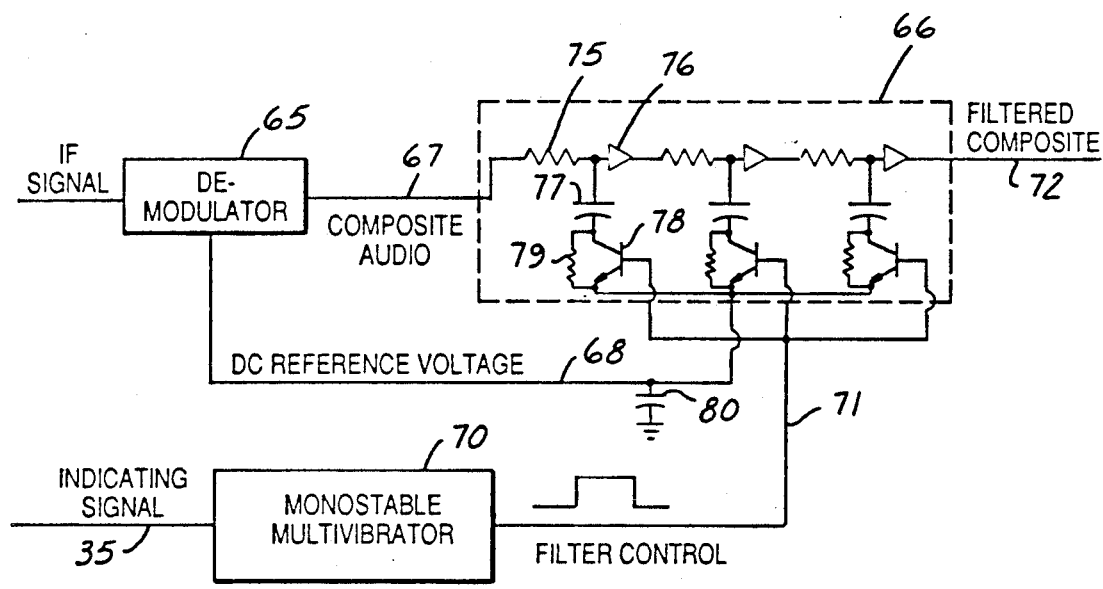
FIG. 5 is a schematic and block diagram showing an FM noise controller according to the present invention.

Turning now to FIG. 5, the present invention can be used in activating an ultrasonic noise filter for improving listening quality when overall signal quality is degraded. Thus, a demodulator 65 receives an IF signal to produce a composite audio output on a line 67. Composite audio output 67 is passed through a switchable low-pass filter 66 to generate a filtered composite audio output 72. Filter 66 preferably includes a plurality of stages, each having a series connected resistor 75 and operational amplifier 76. A filter-stage switch transistor 78 has a collector coupled to the junction of resistor 75 and operational amplifier 76 through a capacitor 77. The emitter of transistor 78 is connected to a DC reference voltage 68 provided by demodulator 65. The collector and emitter of transistor 78 are coupled by a resistor 79 which has a higher resistance than resistor 75 and keeps capacitor 77 at the DC reference voltage independent of the state of transistor 78. A capacitor 80 is coupled between the line carrying DC reference voltage 68 and ground.

Indicating signal 35 from quality detecting circuit 30 (FIG. 3) is provided to the input of a monostable multivibrator 70. A filter control pulse is provided from monostable multivibrator 70 over a line 71 to the base of filter switch transistors 78.

In operation, the logic level of indicating signal 35 is high when the FM signal being received has a high quality. Monostable multivibrator 70 is provided such that it will be triggered to generate an output pulse by a negative going transition of indicating signal 35. While indicating signal 35 remains high, there is no control pulse over line 71 to switch on filter 66. Therefore, composite audio output 67 is passed through filter 66 unchanged to provide the filtered composite signal 72. When interference or noise is present in the received FM signal, indicating signal 35 will oscillate between high and low states. A filter control pulse of a predetermined duration is generated by monostable multivibrator 70 to activate low pass filter 66. The characteristics of low pass filter 66 are such that frequencies below about 19 KHz (i.e., frequencies containing the stereo sum channel and the FM pilot signal) are substantially unaffected while higher frequencies which include the stereo difference sidebands are attenuated.

DC reference voltage 68 is applied to the emitters of switching transistor 78 to provide the same biasing DC potential to the filter as is present in the composite output of the demodulator 65 in order to avoid audio pops when the filter is switched to an active or an inactive state. In other words, demodulator 65 and filter 66 are biased to the same DC reference voltage such that their outputs swing about the same voltage thereby avoiding a change in bias level when filter 66 is switched on or off.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A signal quality detecting circuit for an FM receiver, said receiver including an IF detector generating an intensity signal indicating the received field strength of the FM signal being received and including an FM demodulator generating an automatic frequency control signal indicating a frequency error at which said FM signal is being received, said signal quality detecting circuit comprising:

level detector means adapted to be coupled to said IF detector for Producing a first signal when said intensity signal is greater than a predetermined intensity;

window detector means adapted to be coupled to said FM demodulator for producing a second signal when said automatic frequency control signal is within a predetermined window;

noise filter means adapted to be coupled to said IF detector for generating a filtered noise signal derived from said intensity signal, said filter means rejecting frequencies containing components related to the intelligence contained in said FM signal;

peak detector means coupled to said noise filter means for producing a third signal when said filtered noise signal is below a predetermined peak value; and logic means coupled to said level detector means, said window detector means, and said peak detector means for producing an indicating signal in response to the simultaneous occurrence of said first, second, and third signals to indicate that a high quality FM signal is being received.

2. The circuit of claim 1 further comprising threshold control means coupled to said noise filter means for attenuating said filtered noise signal.

3. The circuit of claim 1 wherein said noise filter means has a lower cutoff frequency to block all frequencies below about 100 kilohertz.

4. The circuit of claim 1 wherein said noise filter means has a lower cutoff frequency equal to about 200 kilohertz.

5. The circuit of claim 1 wherein said noise filter means has an upper cutoff frequency to block all frequencies above about 5 megahertz.

6. The circuit of claim 1 wherein said noise filter means has an upper cutoff frequency equal to about 2 megahertz.

7. An FM receiver for receiving FM broadcast signals, comprising:
- front end tuner means for tuning to an FM signal;
- an IF amplification stage coupled to said front end tuner means;
- IF level means coupled to said IF amplification stage for generating a field intensity signal;
- an FM demodulator coupled to said IF amplification stage, said FM demodulator generating an automatic frequency control signal and an audio output signal;
- level detector means coupled to said IF level means for producing a first signal when said intensity signal is greater than a predetermined intensity;
- window detector means coupled to said FM demodulator for producing a second signal when said automatic frequency control signal is within a predetermined window;
- noise filter means coupled to said IF level means for generating a filtered noise signal derived from said intensity signal, said filter means rejecting frequencies containing components related to the intelligence contained in said FM signal;
- peak detector means coupled to said noise filter means for producing a third signal when said filtered noise signal is below a predetermined peak value; and
- logic means coupled to said level detector means, said window detector means, and said peak detector means for producing an indicating signal in response to the simultaneous occurrence of said first, second, and third signals to indicate that a high quality FM signal is being received.

8. The receiver of claim 7 further comprising:
- scan tuning means coupled to said front end tuner means and to said logic means for scan tuning said receiver in response to a start signal and for stopping said scan tuning in response to said indicating signal.

9. The receiver of claim 7 further comprising:
- noise controller means coupled to said FM demodulator and to said logic means for reducing ultrasonic frequencies contained in said audio output signal from said FM demodulator in response to the absence of said indicating signal.

10. The receiver of claim 9 wherein said noise controller means comprises a monostable multivibrator receiving said indicating signal and a switch-controlled low-pass filter receiving said audio output signal, said switch-controlled low-pass filter being activated by said monostable multivibrator to attenuate said ultrasonic frequencies.

* * * * *